(12) United States Patent  
Vandekerkhof et al.

(10) Patent No.: US 7,240,939 B2  
(45) Date of Patent: Jul. 10, 2007

(54) TRUCK BED LOADING PLATFORM

(76) Inventors: Nathan P. Vandekerkhof, 43874 Leelanau Trail, Chesterfield, MI (US) 48038; Michael Nikodinovski, 47477 Sugarbush, Chesterfield, MI (US) 48047

( * ) Notice: Subject to any disclaimer, the term of this patent is extended or adjusted under 35 U.S.C. 154(b) by 98 days.

(21) Appl. No.: 10/943,174

(22) Filed: Sep. 16, 2004

(65) Prior Publication Data  
US 2005/0062306 A1 Mar. 24, 2005

Related U.S. Application Data

(60) Provisional application No. 60/504,588, filed on Sep. 18, 2003.

(51) Int. Cl.  
*B62D 33/08* (2006.01)

(52) U.S. Cl. .................. 296/26.09; 296/26.1; 414/522

(58) Field of Classification Search ............ 296/26.08, 296/26.09, 26.1, 26.11, 26.14, 61; 414/522, 414/537  
See application file for complete search history.

(56) References Cited

U.S. PATENT DOCUMENTS

| 4,305,695 A | 12/1981 | Zachrich |
| 4,685,857 A | 8/1987 | Goeser et al. |
| 4,824,158 A | 4/1989 | Peters et al. |
| 4,830,242 A | 5/1989 | Painter |
| 4,889,377 A | 12/1989 | Hughes |
| 4,900,217 A * | 2/1990 | Nelson ................ 414/537 |
| 4,909,558 A | 3/1990 | Roshinsky |
| 4,950,123 A | 8/1990 | Brockhaus |
| 4,993,088 A | 2/1991 | Chudik |
| 5,064,335 A | 11/1991 | Bergeron et al. |
| 5,098,146 A | 3/1992 | Albrecht et al. |
| 5,513,941 A | 5/1996 | Kulas et al. |
| 5,533,771 A * | 7/1996 | Taylor et al. ............ 296/26.1 |
| 5,544,998 A | 8/1996 | Malinowski |
| 5,564,767 A | 10/1996 | Strepek |
| 5,624,223 A * | 4/1997 | Lovato .................... 414/480 |
| 5,803,523 A | 9/1998 | Clark et al. |
| 5,820,190 A | 10/1998 | Benner |
| 5,829,945 A | 11/1998 | Stanley |
| 5,934,725 A | 8/1999 | Bowers |
| 5,944,371 A | 8/1999 | Steiner et al. |
| 5,988,722 A | 11/1999 | Parri |
| 6,082,800 A | 7/2000 | Schambre et al. |
| 6,120,075 A | 9/2000 | Terry |
| 6,244,646 B1 | 6/2001 | Wheeler, III |
| D452,472 S | 12/2001 | Darbishire |
| 6,390,525 B2 | 5/2002 | Carpenter et al. |
| D458,209 S | 6/2002 | Darbishire |
| 6,464,274 B2 | 10/2002 | Mink et al. |
| 6,533,525 B2 | 3/2003 | Haid et al. |
| 6,601,899 B2 | 8/2003 | Kiester et al. |
| 6,921,120 B1 * | 7/2005 | Ervin .................. 296/26.02 |
| 2002/0076312 A1 | 6/2002 | Schatzler et al. |

* cited by examiner

*Primary Examiner*—Lori L. Lyjak  
(74) *Attorney, Agent, or Firm*—Young Basile Hanlon MacFarlane & Helmholdt

(57) ABSTRACT

A truck bed loading platform including a rail mountable on a truck bed. The platform also includes a first and second hingedly connected tray portions. Furthermore, the platform includes means for slidably mounting the first and second tray portions on the rail for sliding movement between first and second positions. The rail includes a plurality of longitudinally spaced rollers. The platform can include an optional handle(s) for facilitating manual sliding of the platform. The platform can also include an optional lock for locking the entire platform in place on a truck bed.

28 Claims, 12 Drawing Sheets ically identically constructed and may be the same or different lengths. The first tray portion 22 can be longer than the second tray portion 24. Thus, the following description of the construction of the frame 20 for the second tray portion 24 will be understood to apply equally to the construction of the frame 20 for the first tray portion 22.

TRUCK BED LOADING PLATFORM

CROSS REFERENCE TO CO-PENDING APPLICATION

This Application claims the benefit of the filing date of U.S. Provisional Patent Application, Ser. No. 60/504,588, filed Sep. 18, 2003, the entire contents of which are incorporated herein.

BACKGROUND

Truck beds are designed to carry cargo. However, the length of truck beds makes it difficult to access cargo stored at the forward end of the truck bed near the cab unless someone climbs into the truck bed.

To address this problem, many cargo trays or extendable frame devices have been designed for mounting in truck beds. Such devices are anchored to the truck bed. A tray is mounted on rails and is slidable relative to the rails from a first position completely overlaying the rails to a second position, usually cantilevered from the tailgate of the truck wherein substantially all of the tray extends from the end of the frame adjacent to the tailgate of the truck.

Since the tray usually extends over substantially the full length of the truck bed, it must be fully extended rearward of the tailgate to access cargo at the forward end of the tray. However, even with the tray fully extended, cargo at the forward end of the tray can only be accessed from the side of the tray adjacent to the tailgate. In addition, heavier cargo on pallets cannot be loaded or unloaded to or from the forward end of the tray since the forklift truck typically used to move such pallets cannot ride over the tray to the forward end of the tray.

Thus, it would be desirable to provide a truck bed loading platform which allows easy access to the forward end of the platform, particularly for forklift trucks, to load and unload cargo on the forward end of the platform.

SUMMARY

The present invention is a truck bed loading platform including rail means mountable on a truck bed. The platform includes a first and second hingedly connected tray portions. Furthermore, the platform includes means for slidably mounting the first and second tray portions on the rail means for sliding movement between a first position and a second position.

The platform includes a plurality of longitudinally spaced roller assemblies which slidably support the first and second tray portions on the rail for movement between a first and second hinged position. The first position is a generally linear position in which the first and second tray portions are coplanarly aligned on the truck bed. In the second position, the second tray portion extends angularly from the truck bed.

An optional feature of the platform encompasses a handle(s) being mounted on one end of the second tray portion. The handle includes a hand grip surface. The handle facilitates manual sliding of the platform between the first and second positions.

The platform can include a lock means mounted on at least one of the first and second tray portions for locking the entire platform in one or more longitudinally spaced positions on the truck bed.

In conclusion, the present invention allows easy access to the forward end of the platform, particularly for forklift trucks to load and unload cargo on the forward end of the platform.

BRIEF DESCRIPTION OF THE DRAWINGS

The various features, advantages and other uses of the present invention will become more apparent by referring to the following detailed description and drawing in which.

DETAILED DESCRIPTION

Referring now to FIGS. 1–12 of the drawings, there is depicted a truck bed loading and unloading platform or apparatus 10 according to the present invention.

Figure 1:
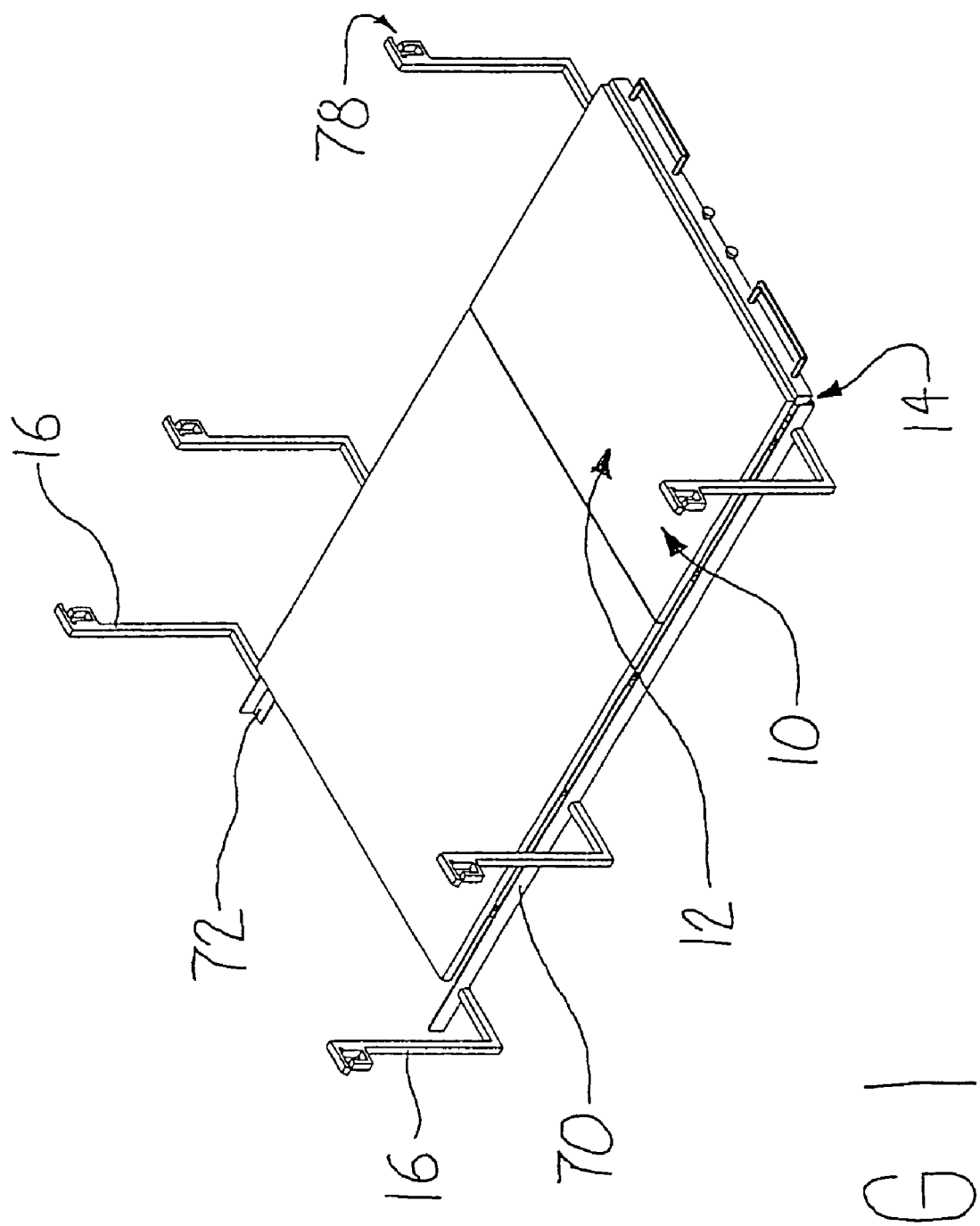
FIG. 1 is a perspective view of the truck bed loading platform according to the present invention shown in a fully retracted, load carrying position.

It will be understood that the loading and unloading apparatus 10 of the present invention, while described hereafter as being mounted in an open truck bed, as shown in FIG. 1, can also be advantageously mounted in vans, and other vehicles having a closed cargo compartment.

As shown in FIG. 1, the apparatus 10 includes a tray 12 which is slidably mounted on rail means 14. The rail means 14 are fixedly mounted to the truck bed by means of rail mounts or clamps 16.

Figure 2:
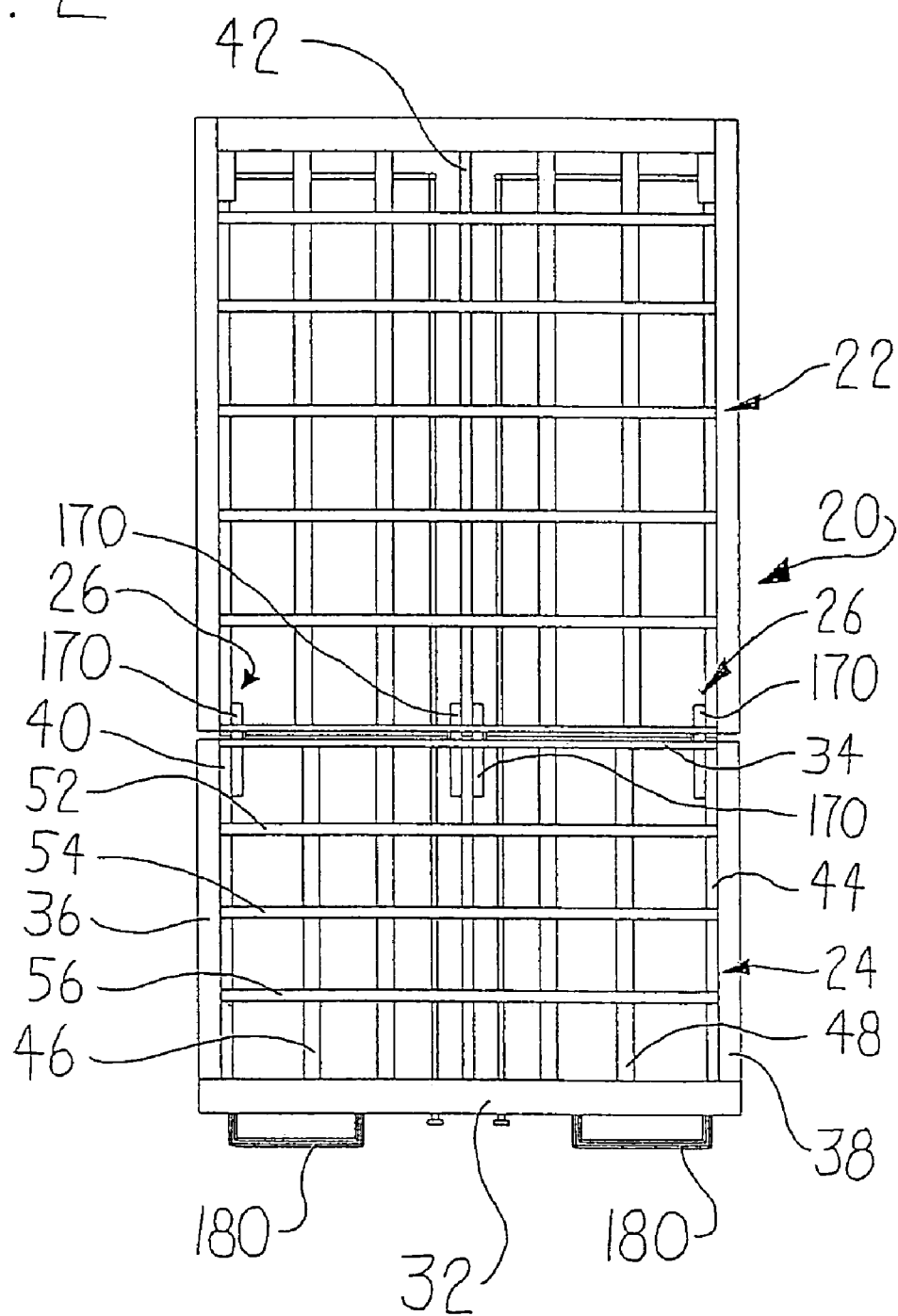
FIG. 2 is a plan view of a frame of the platform shown in FIG. 1.

The tray 12 includes a frame structure 20 shown in FIG. 2 constructed of a first tray portion 22 and at least one second tray portion 24. The first and second tray portions 22 and 24 are pivotally connected at facing edges by hinge means 26.

The first and second tray portions 22 and 24 are substantially identically constructed and may be the same or different lengths. The first tray portion 22 can be longer than the second tray portion 24. Thus, the following description of the construction of the frame 20 for the second tray portion 24 will be understood to apply equally to the construction of the frame 20 for the first tray portion 22.

As shown in FIGS. 2–9, the frame 20 includes a pair of spaced lateral tubular members 32 and 34 which are joined at opposite ends by means of longitudinal support or angle members 36 and 38. A plurality, such as three by way of example only, of longitudinally extending lateral members 40, 42 and 44 are fixed, such as by welding, at opposite ends to the tubular members 32 and 34. The laterally outermost longitudinal tubular members 40 and 44 may also be joined by means of fasteners, welds, etc., to the angle members 36 and 38, respectively.

Figure 9:
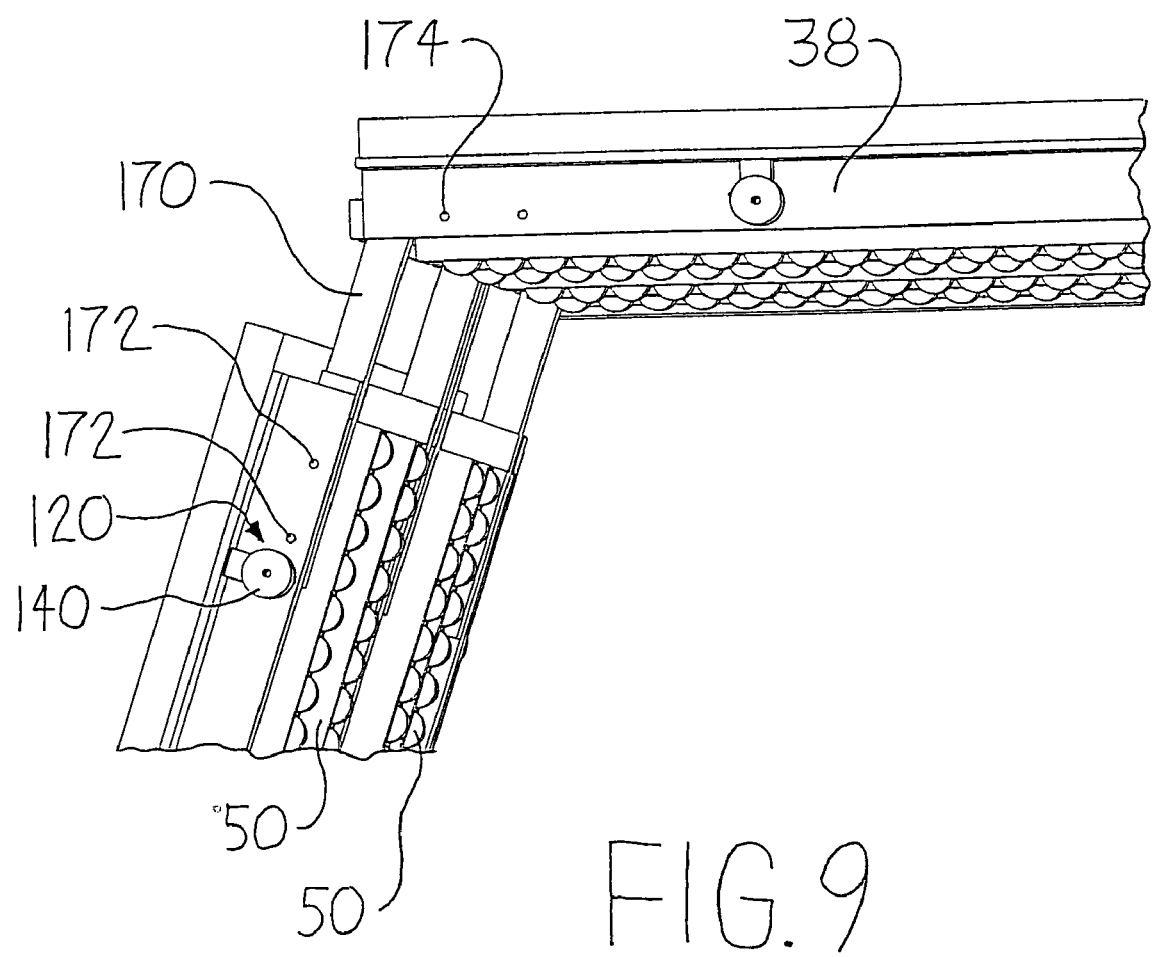
FIG. 9 is a bottom, perspective view of the platform similar to FIG. 8.

Inverted U-shaped channel members 46 and 48, each carrying a plurality of linearly aligned rollers or wheels 50, see FIG. 9, are also fixed at opposite ends to the tubular members 32 and 34, such as by welding. A plurality of cross members, with three cross members 52, 54 and 56 being shown by way of example only, are fixed at opposite ends to the angle members 36 and 38 and may optionally be joined, such as by welding, to the tubular members 40, 42 and 44.

This arrangement forms a lattice-ike structure for the frame 20 which provides both a lightweight and strong construction. A plate 60 is mounted over the frame 20 and attached to the angle members 36 and 38 and the tubular members 32 and 34 by suitable fastening means, such as mechanical fasteners, welds, etc. By way of example only, the plate 60 is shown as a step-type plate formed with alternating projections for a relatively slip-free surface.

As explained above, the same frame structure applies for the frame of the first tray portion 22.

The rail means 14 shown in FIGS. 1, 3, 4 and 5 includes a pair of longitudinally extending, laterally spaced angle members 70 and 72. The angle members 70 and 72 are stationarily mounted on the truck bed 74 by clamp members 78. A plurality of clamp members 78 are located along each longitudinal edge of the rails 70 and 72.

Figure 3:
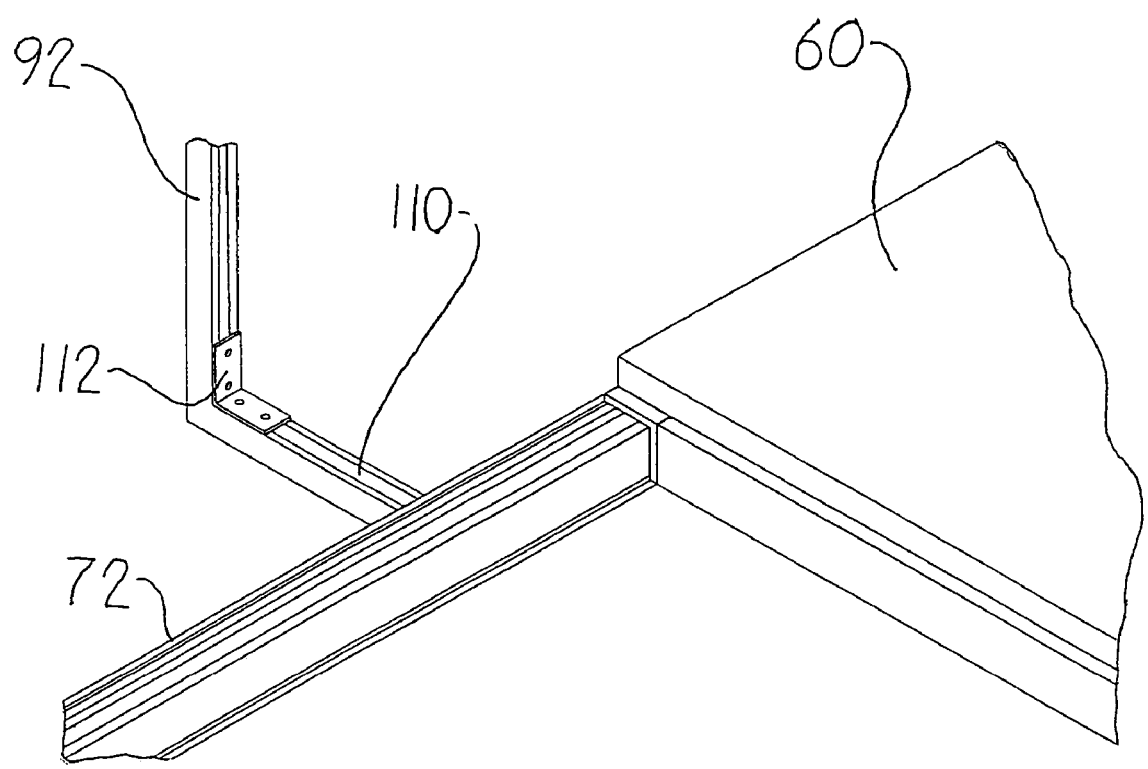
FIG. 3 is a partial, perspective view of a forward end of the apparatus shown in FIGS. 1 and 2.
Figure 4:
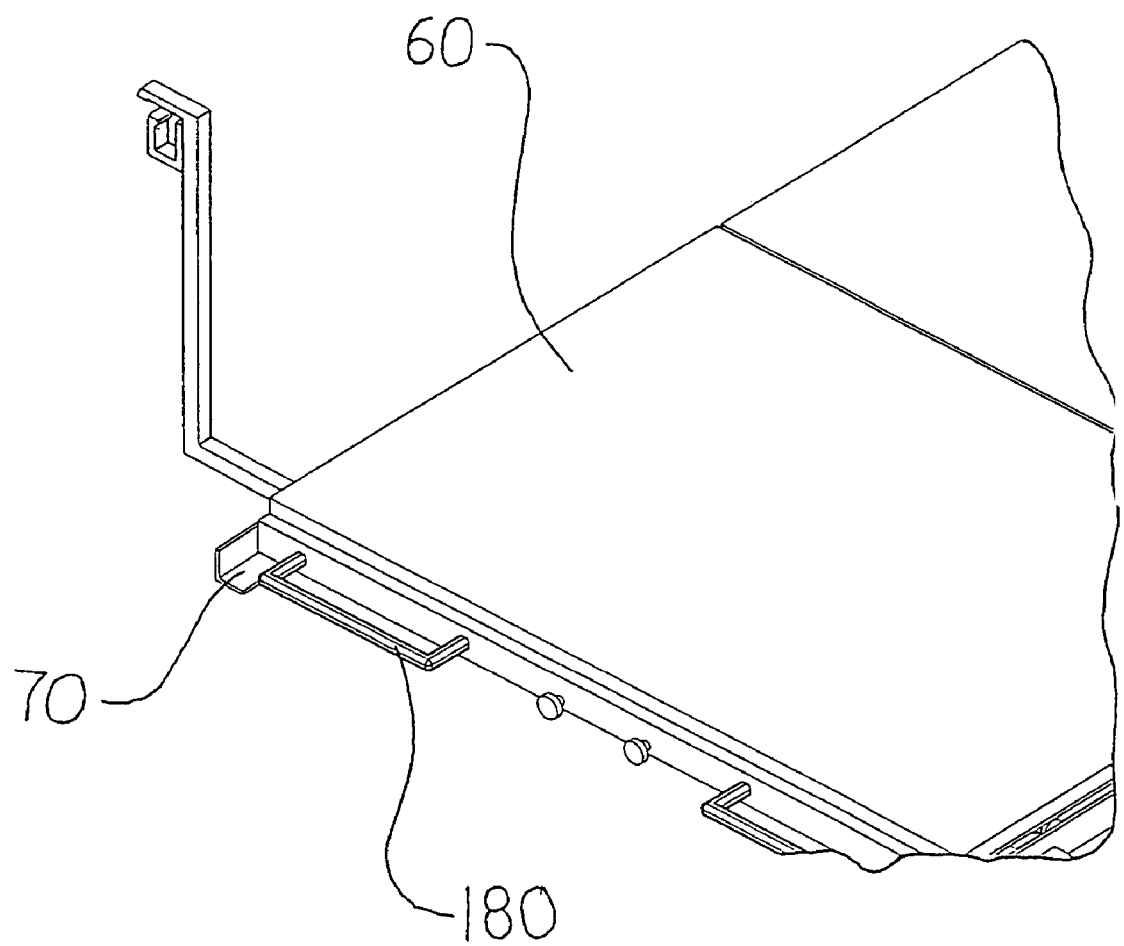
FIG. 4 is a partial, perspective view of a rear end of the platform shown in FIGS. 1 and 2.
Figure 5:
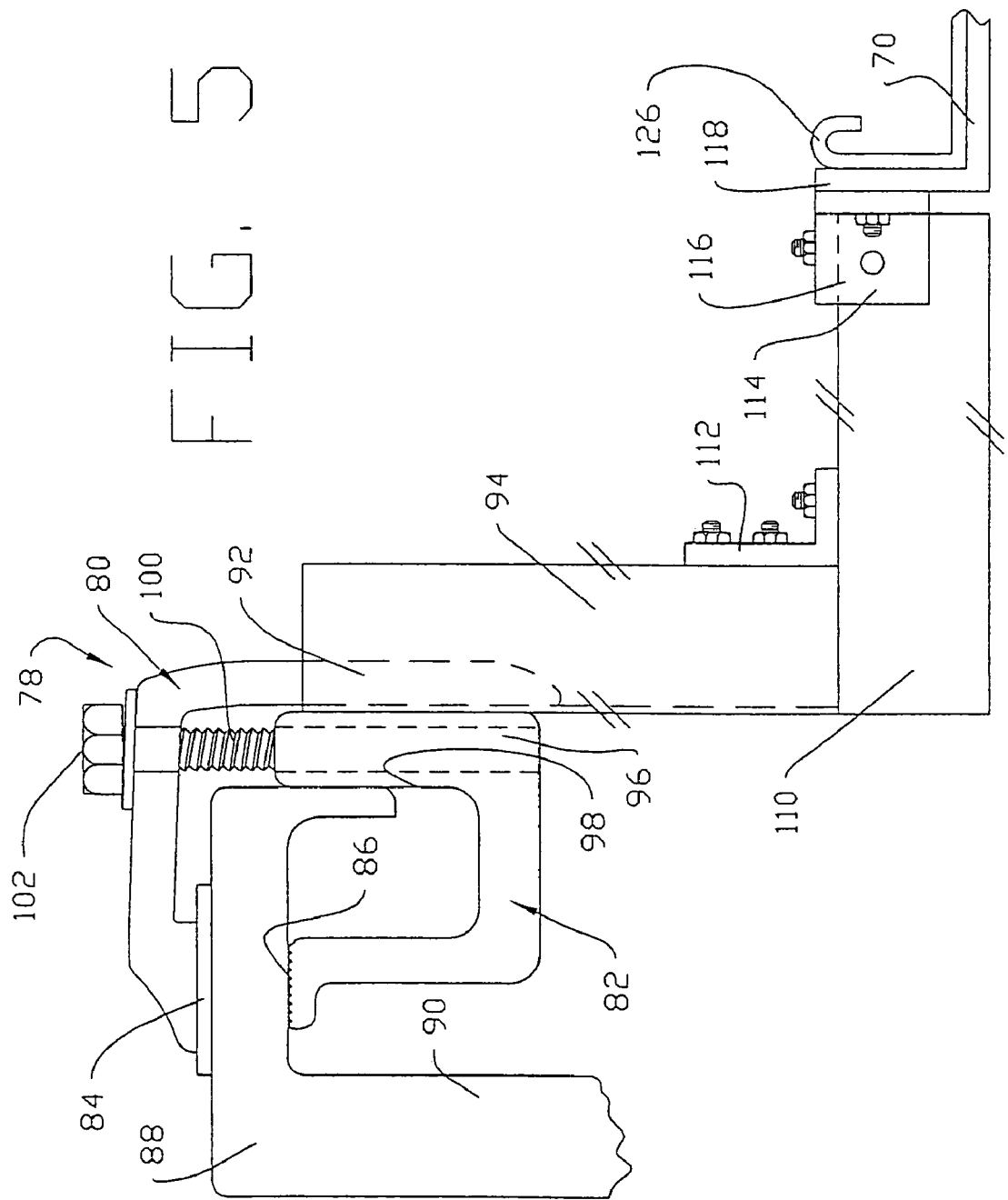
FIG. 5 is a partial, end view of a clamp assembly of the frame.

As shown in FIGS. 3–5, each clamp assembly 78 includes a two-part clamp formed of generally inverted L-shaped arms 80 and 82 which have bearing surfaces 84 and 86, respectively, disposed against opposite sides of an in-turned wall 88 of the truck bed side wall 90. Plates may be interposed between the bearing surfaces 84 and 86 and the truck bed wall 88 to protect the wall 88 and to more equally distribute clamping forces on the upper wall 88.

The arm 80 includes a depending portion 92 which is adapted to engage an inner surface of a strut 94, generally in the form of a U-shaped strut, commonly sold under the name Uni-Strut. An end leg portion 96 of the arm 82 extends along an outer surface of the strut 94. The end leg portion 96 includes an internally threaded bore 98 which receives the threaded shank 100 of a bolt 102 which extends through a similar bore in the arm 80. Tightening or loosening of the bolt 102 causes the arms 80 and 82 to move toward each other in tightening engagement with the wall of the strut 94 or in an opposite direction separating the depending portions 92 and 96 enabling movement of the strut 94 relative to the truck bed 74.

As shown in FIGS. 3 and 5, a short length strut 110 extends from the bottom of the strut 94 and is supported by welds or an angle strap 112 which is bolted to both of the struts 94 and 110. The opposite end of the short strut 110 is fixed to one leg of the rails 70 or 72 by means of a T-shaped strut 114, such as a strut sold by Unistrut as product number P2345, for example. The leg 116 or the strut 114 is fastened to the strut 110. Each of the two arms 118 extending from one end of the leg 116 are fastened to one leg of the angle member 70.

Figure 6:
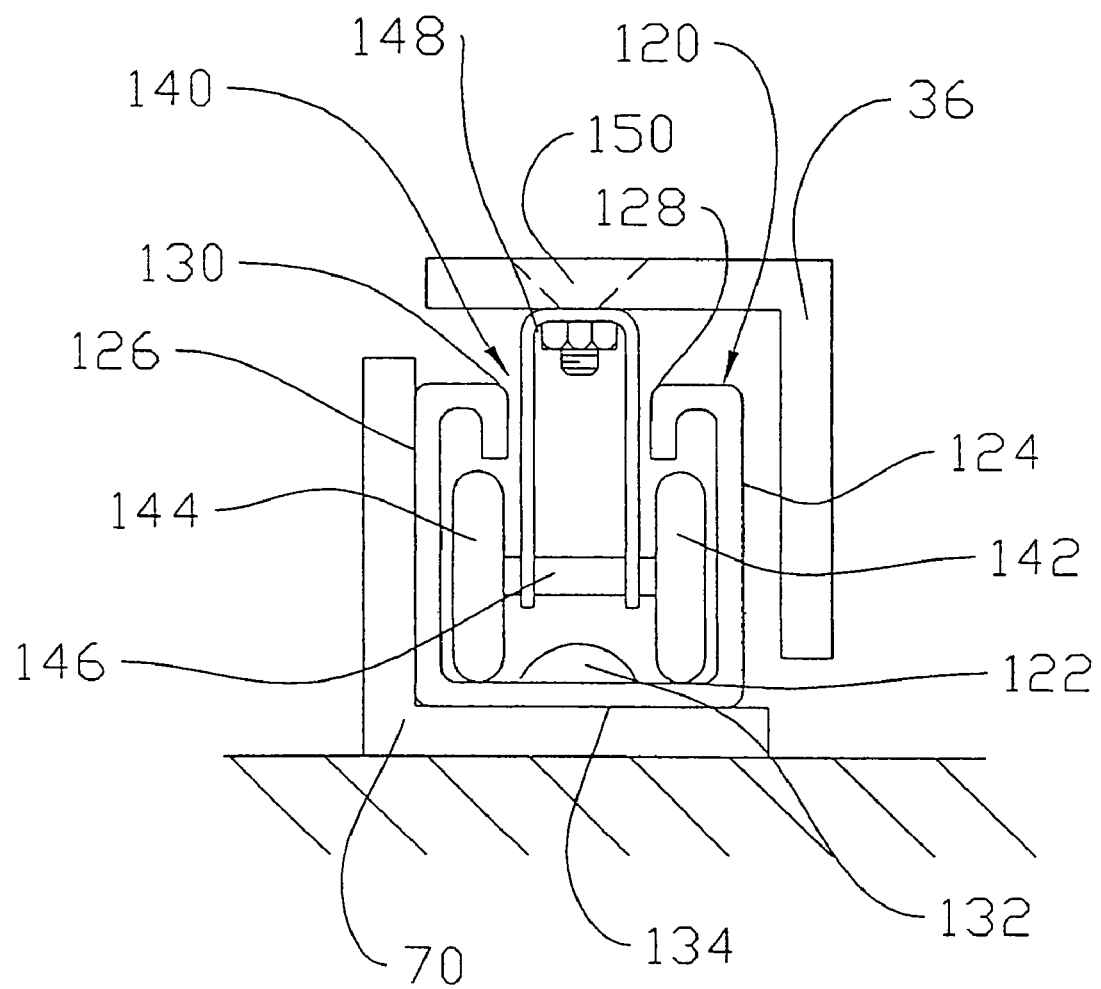
FIG. 6 is an end view of one aspect of a roller assembly.

Referring to FIG. 6, a channel member 120, such as a Uni-Strut member is formed with a central wall 122 and opposed side walls 124 and 126, each terminating in inward turned ends 128 and 130. The member 120 is fixed to the angle member 70 by suitable means, such as welds or bolts 132. A plurality of linearly spaced apertures 134 may be formed in one leg of the angle member 70 for receiving the shank and head of each bolt 132.

The channel member 120 defines an interior chamber which receives a plurality of longitudinally spaced roller assemblies 140, each formed of one or more wheels, with two rollers or wheels 142 and 144 depicted by way of example only. The wheels 142 and 144 are rotatably mounted on an axle 146. The axle 146 is carried in a bracket 148 in the form of an inverted U-shaped member, by way of example only, which is fixed, such as by mechanical fasteners 150, at spaced linear locations to one leg of one of the angle members 36 and 38 on the first and second tray portions 22 and 24. In this manner, the roller assemblies 140, which are spaced linearly apart to distribute weight on the tray portions 22 and 24, slidably supports the tray portions 22 and 24 on the rails 70 and 72 for movement between a first, generally linear position in which the first and second tray portions 22 and 24, as shown in FIGS. 1 and 2 are coplanarly aligned on the truck bed 74 and a second hinged position shown in FIGS. 8 and 9 in which the second tray portion 24 extends angularly from the truck bed 74 at an angle approaching perpendicularly from the first tray portion 22 which still has at least a portion overlaying the truck bed 74.

Figure 7:
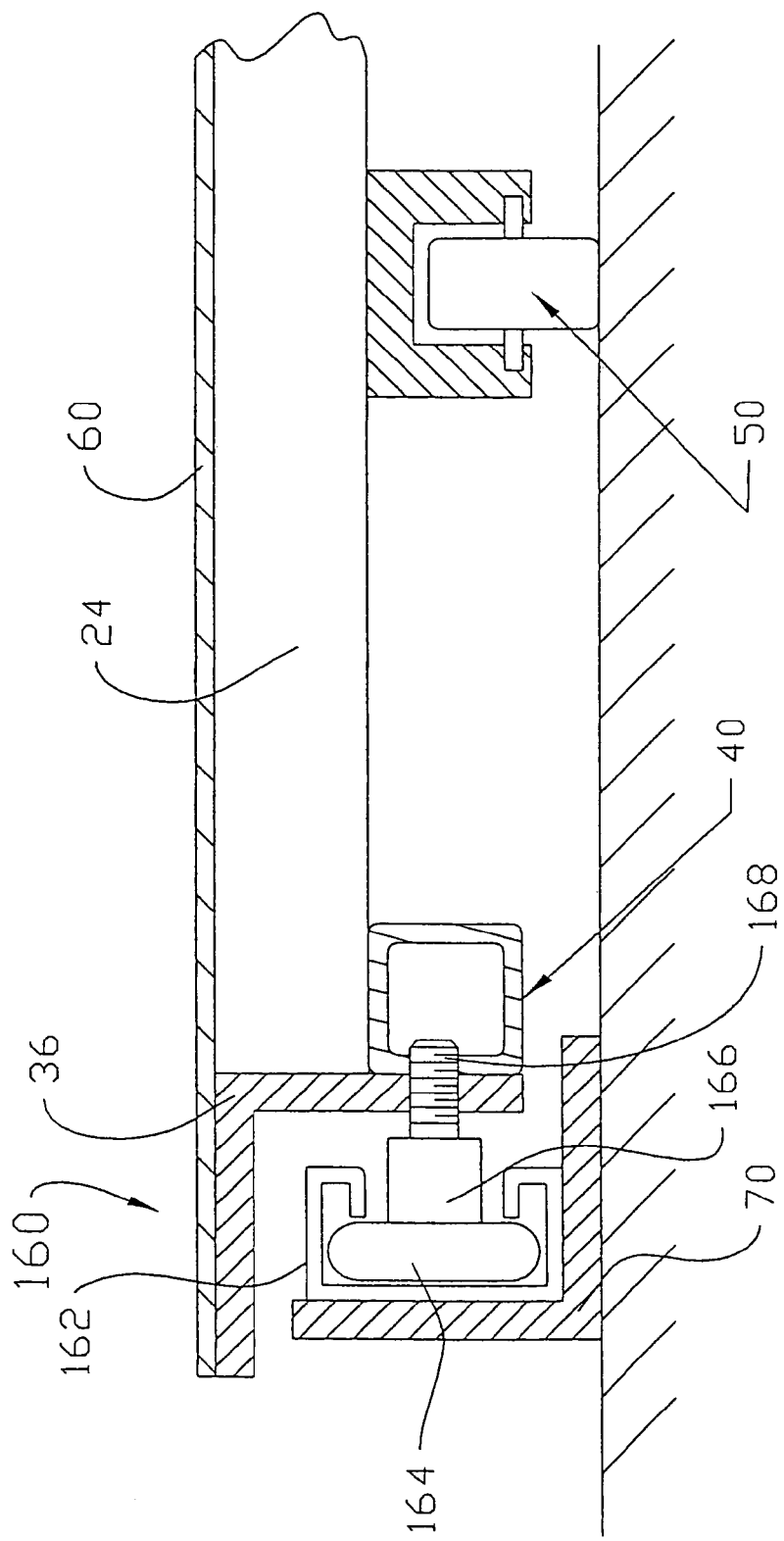
FIG. 7 is an end view of another aspect of the roller assembly.

An alternate roller means 160, shown in FIG. 7 may also be employed in the platform 10. In this aspect of the invention, a strut 162, similar shaped as strut 120, but disposed in a generally C-orientation is secured to the angle member 70 by welds, fasteners, etc., in the same manner as the strut 120 is secured to the angle member 70.

A plurality of individual track rollers 164 carried on axles 166 are fixed to the angle member 36 of the second tray portion 24, as well as at spaced locations to the first tray 22, not shown, by means of a threaded shank 168 extending from the axle 166. The threaded shank 168 engages a threaded bore in the angle member 36.

Figure 8:
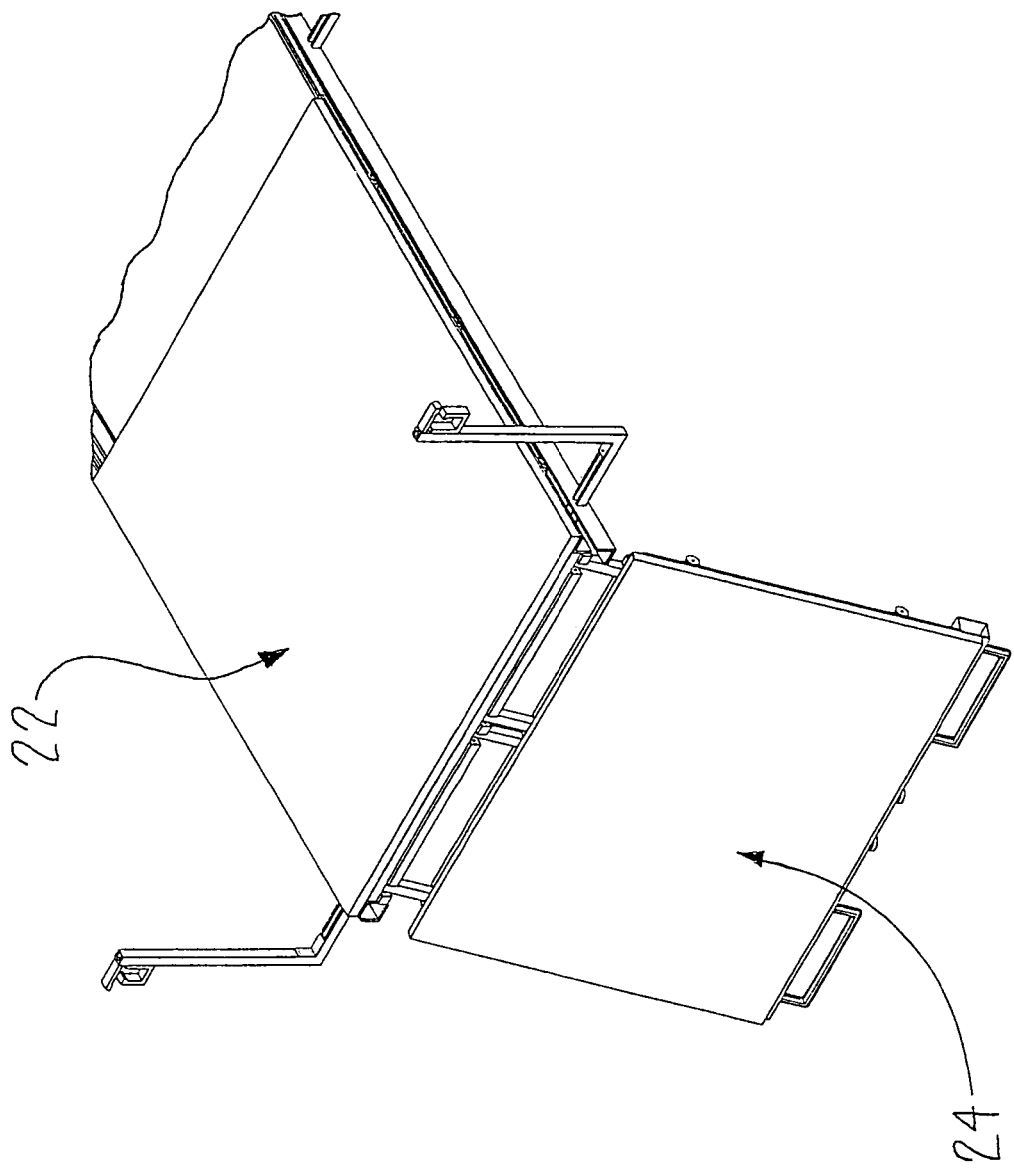
FIG. 8 is a partial, perspective view showing the platform in a hinged, unloading position.

The hinge means 26 shown generally in FIG. 2, and in greater detail in FIGS. 2, 8 and 9, allows pivotal movement of the second tray portion 24 relative to the first tray portion 22 during repositioning of the entire platform 10 relative to the rails 70 and 72. As shown in FIG. 9, each of the hinge means 26 includes a bar 170 that is fixedly secured at one end to one of the tubular members 40 and one of the angle members, such as angle member 36 of the first or second tray portions 22 and 24. As shown in FIG. 9, one of the laterally outermost bars 170 is fixed by means of bolts 172 which extend through one leg of the angle member 36 and into bores in the tubular member 40 of the frame 20 through bores formed in one end of the bar 170. The other end of the bar 170 is rotatably fixed by means of a pivot shaft 174 to the adjacent angle member of the first tray portion 22. This same hinge 26 is repeated at a plurality of laterally spaced locations across the width of the first and second tray portions 22 and 24 as shown in FIGS. 2 and 9.

Figure 10:
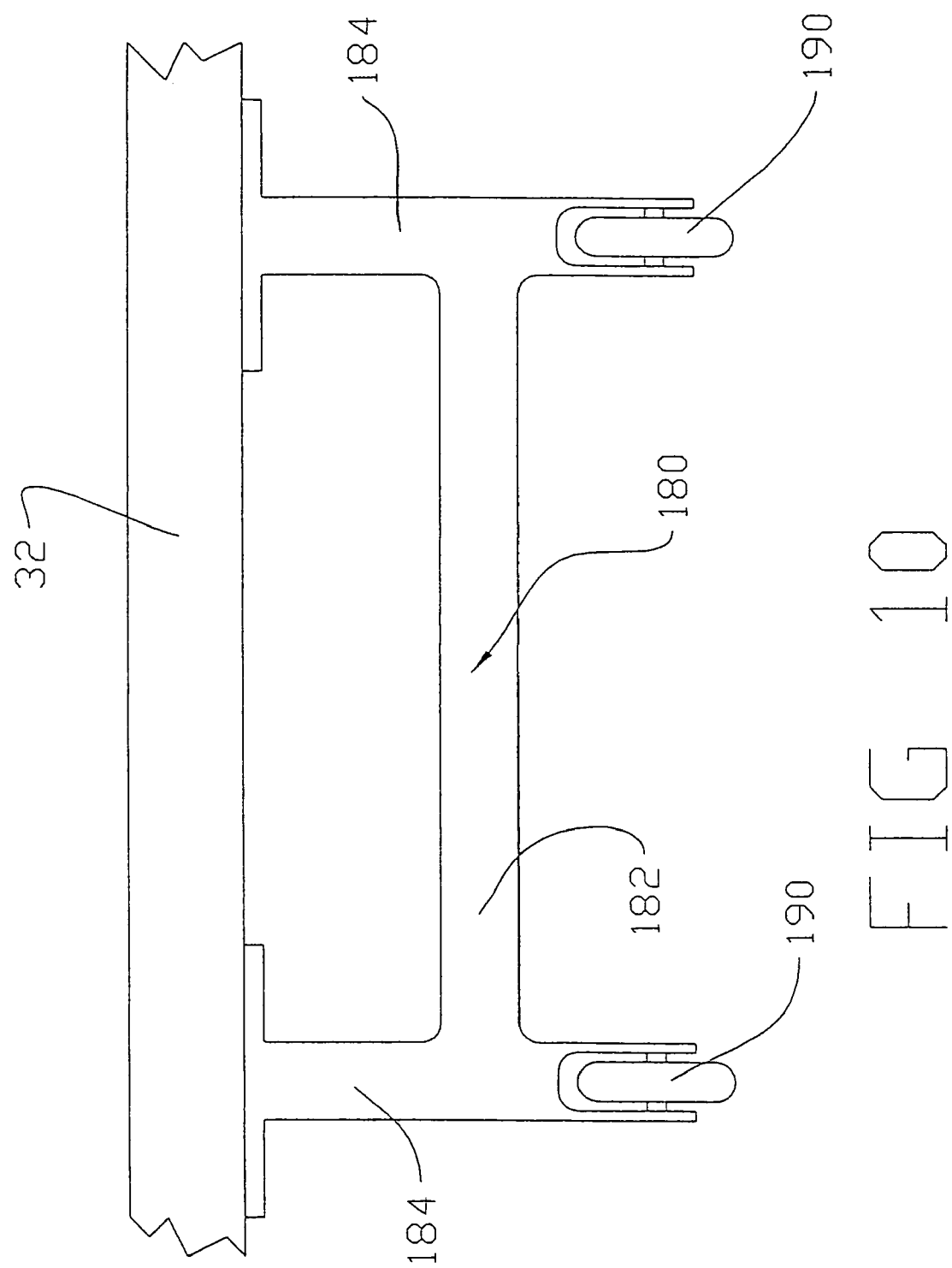
FIG. 10 is a partial, plan view showing a modification to the tray handles.

An additional feature of the present invention is shown in FIGS. 2, 4 and 10. At least one and preferably a pair of handles 180 are fixedly mounted by welds, fasteners, etc., to the tubular member 32 on one end of the second tray portion 24. Each handle 180 has a hand grip surface or bar 182 which is spaced from the tubular member 32 by side legs 184. The handles 180 facilitate manual sliding of the platform 10 between the first and second positions.

An optional feature of the handle 180 is shown in FIG. 10. At least one and preferably a plurality of rollers or castors 190, with two being shown by way of example only, are mounted on opposite ends of the hand grip bar 182. The casters or rollers 190 are positioned to engage the ground surface when the second tray portion is in the hinged, depending position shown in FIG. 8. The casters 190 facilitate movement of the end of the second tray portion 24 along the ground surface during extension of the platform 10 relative to the truck bed 74.

The rollers or castors 190 could also be mounted on the tubular member 32 to extend outward beyond the outer extent of the hand grip 182 of the handles 180.

Figure 11:
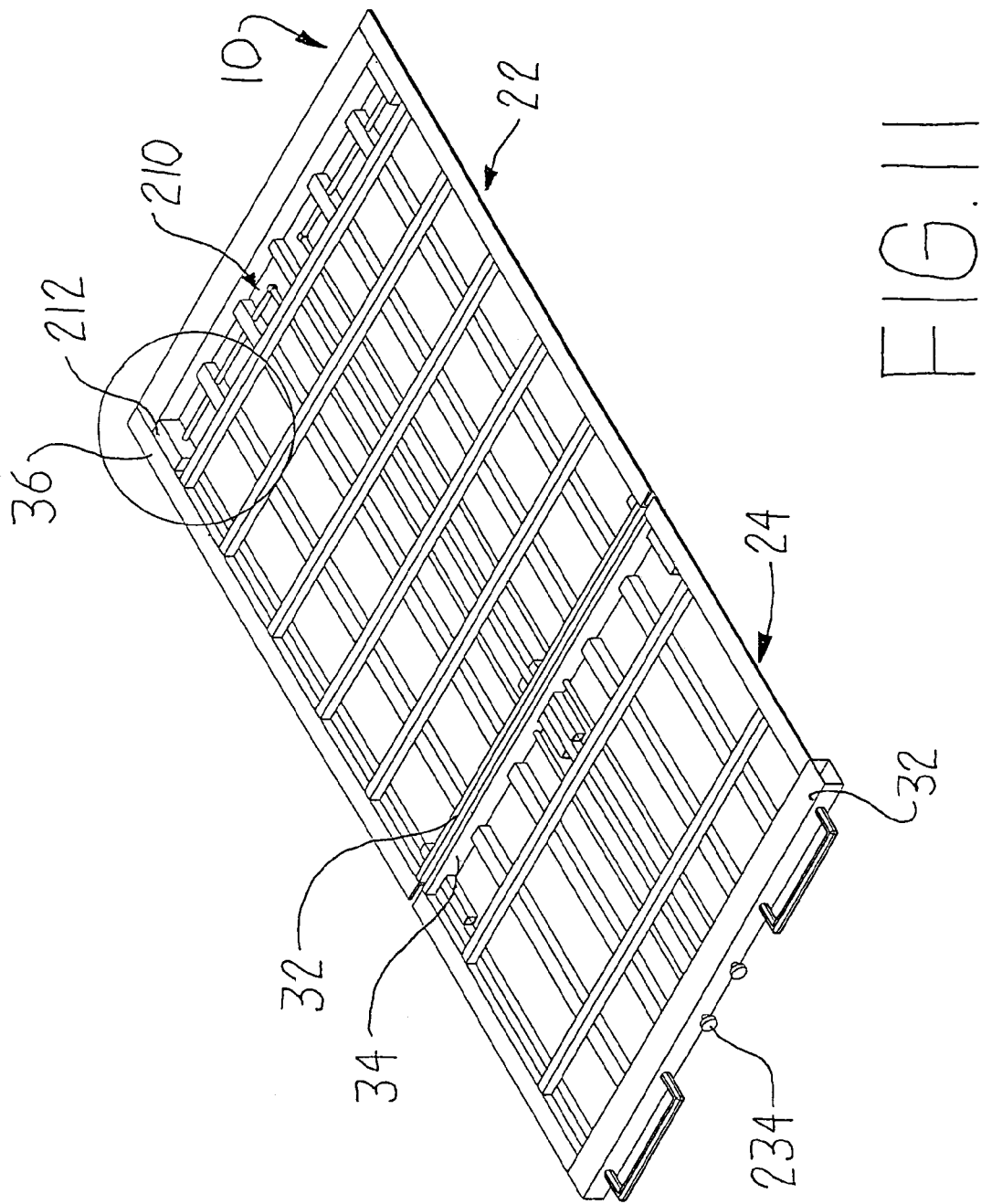
FIG. 11 is a perspective view of another aspect of the apparatus with a releasable lock means.
Figure 12:
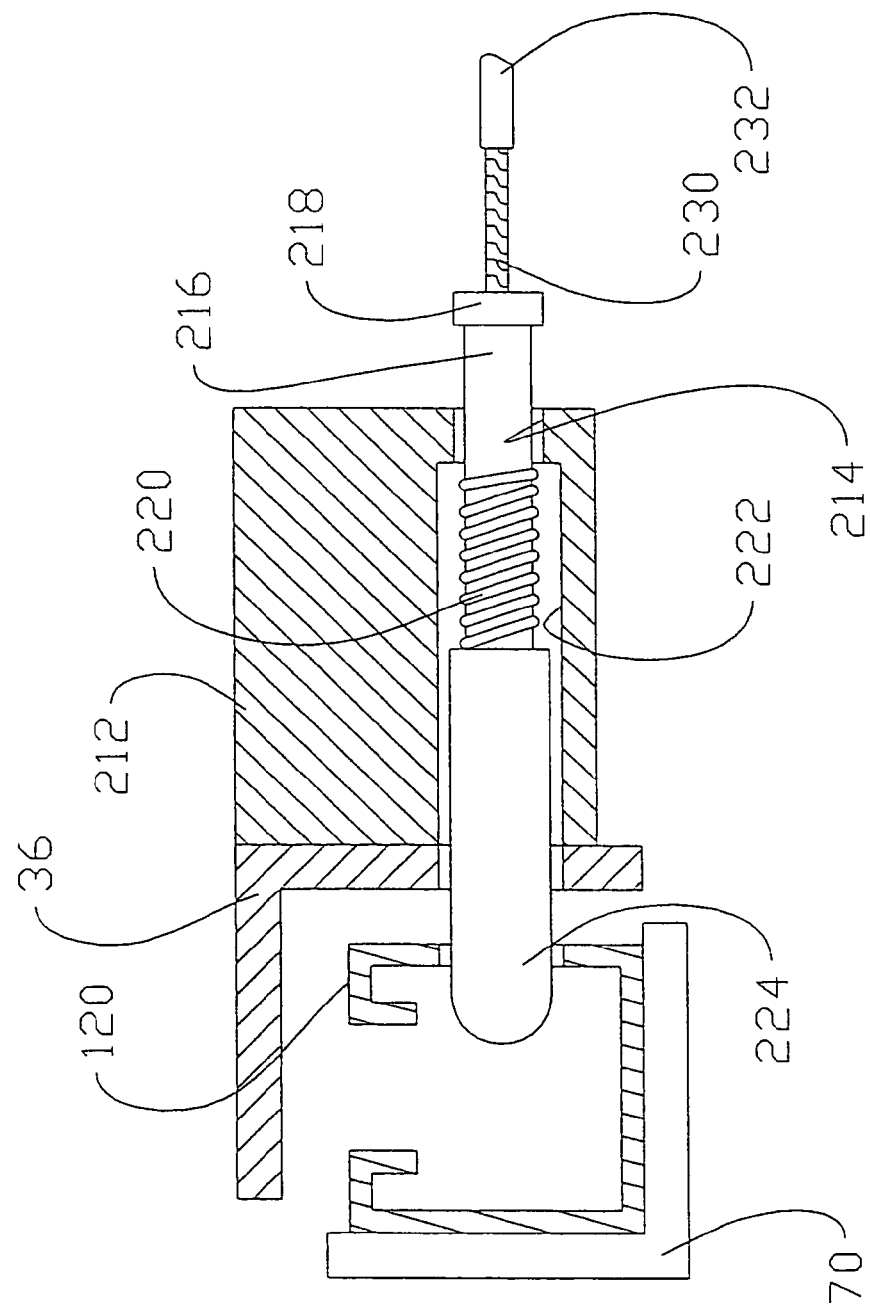
FIG. 12 is a plan view of the lock means shown in FIG. 11.

Referring now to FIGS. 11 and 12, there is depicted a lock means 210 which can be mounted in the first and second tray portions 22 and 24 for locking the entire platform 10 in one or more longitudinally spaced positions on the truck bed 74. By way of example only, a housing or block 212 is fixedly mounted at one end of the first tray portion 22, adjacent to the side angle member 36. The block 212 contains a through bore 214 through which extends a rod 216. A stop 218 is formed on the rod 216 to limit axial movement of the rod 216 relative to the block 212. A biasing means 220, such as a coil spring, is disposed within an enlarged bore 222 in the block 212. The biasing means or spring 220 seats at one end against a shoulder formed at one end of the bore 222 and normally biases a pin or dowel 224 outward through one end 226 of the block 212. The pin 224 extends through an aperture formed in one leg of the angle member 36 and is engagable with one or more apertures, not shown, spaced along the one leg of the rail 70.

The rod 214 is connected to a push/pull cable 230 which extends through a stationary sheath 232 to a push/pull knob 234. The cable 230 and sheath 232 can extend through apertures formed in the tubular members 32 and 34 at facing edges of the first and second tray portions 22 and 24 and an aperture in a tubular member 32 at the outer end of the second tray portion 24. The knob 234 may take any suitable hand grip shape.

In operation, the spring 220 will normally bias the pin 224 outward through an aperture in the angle member 36 into one aperture in the rail 70. This aperture may be longitudinally positioned to lock the entire platform 10 in the first position wherein the entire platform 10 overlays the truck bed 74 with the first and second tray portions 22 and 24 in a coplanar arrangement.

When it is necessary to extend the platform 10, the user pulls on the knob 234. This causes the cable 230 to retract the pin 224 from the aperture in one end of the rail 70. The entire platform 10 can be extended to the desired position for loading or unloading operations. In the second position, a similar aperture may be formed in the rail 70 at an intermediate position between the cab and the tailgate of the truck bed. This could coincide with the downward hinged position of the second tray portion 24 shown in FIG. 8.

In either position, and any other intermediate positions that may also be employed, the platform 10 is locked from longitudinal sliding movement. This is particularly advantageous during movement of the vehicle.

As described in the specification and shown in the drawings, the present invention allows easy access to the forward end of the platform by forklift trucks for loading and unloading cargo on the forward end of the platform.

What is claimed is:

1. A truck bed loading platform adapted to be mounted on a truck bed comprising:
    first and second tray portions adapted to be slidable mounted in the truck bed; and
    a hinge connecting the first and second tray portions for movement between a first coplanar position over the truck bed and a second position in which the second tray portion extends angularly up to perpendicular from the truck bed relative to the first tray portion.

2. The truck bed loading platform of claim 1 wherein the mounting means includes a rail mountable an the truck bed.

3. The truck bed loading platform of claim 2 further comprising means for coupling the rail to the truck bed.

4. The truck bed loading platform of claim 3 wherein the coupling means comprises:
    clamp means coupled to the rail for mounting the rail to the truck bed.

5. The truck bed loading platform of claim 4 wherein the clamp means further comprises a first arm having a bearing surface and a second arm having a bearing surface, the bearing surfaces adapted for mounting to a side wall of the truck bed.

6. The truck bed loading platform of claim 1 wherein the first and second tray portions each include a frame.

7. The truck bed loading platform of claim 6 wherein the length of the first and second tray portions are one of the same and different.

8. The track bed loading platform of claim 6 wherein the frame further comprises a plurality of tubular members.

9. The truck bed loading platform of claim 8 wherein the frame further comprises a plurality of support members coupled to the tubular members for joining the tubular members.

10. The truck bed loading platform of claim 8 wherein the frame further comprises a plurality of U-shaped members fixedly attached to the tubular members.

11. The truck bed loading platform of claim 10 wherein the frame further comprises a plurality of rollers coupled to the U-shaped members.

12. The truck bed loading platform of claim 6 further comprising a plate fixedly mounted to the frame.

13. The track bed loading platform of claim 12 wherein the plate further comprises alternating projections forming a slip-free surface.

14. The truck bed loading platform of claim 6 wherein the frame further comprises a channel member fanned with a central wall and an opposed side walls.

15. The truck bed loading platform of claim 14 wherein the channel member further comprises an interior chamber.

16. The truck bed loading platform of claim 15 wherein the mounting means further comprises roller means carried in the interior chamber for slidably supporting the first and second tray portions on a rail.

17. The truck bed loading platform of claim 16 wherein the roller means further comprises a wheel.

18. The tuck bed loading platform of claim 16 wherein at least one roller means is fixed to a support on the first and second tray portions.

19. The truck bed loading platform of claim 1 further comprising at least one handle fixedly attached to the second tray portions.

20. The truck bed loading platform of claim 19 wherein the handle further comprises a hand grip.

21. The truck bed loading platform of claim 20 further comprising roller means carried on the handle for slidably moving the handle.

22. The truck bed loading platform of claim 1 further comprising lock means on at least one of the first and second tray portions for locking the first and second tray portions in at least one of a plurality of longitudinally spaced positions on the truck bed.

23. The truck bed loading platform of claim 22 further comprising a housing fixedly mounted at one end of the first tray portion.

24. The truck bed loading platform of claim 23 wherein the housing further comprises a first bore, a rod extending through the first bore.

25. The truck bed loading platform of claim 24 further comprising stop means on the rod for limiting axial movement of the rod relative to the housing.

26. The truck bed loading platform of claim 23 wherein the housing further comprises a second bore including biasing means disposed in the second bore, for biasing a rod outward from the housing, the second bore being adjacent a first bore.

27. The truck bed loading platform of claim 26 further comprising an aperture of a support member coaxially aligned with an aperture in a rail, the rod extending through the aperture of the support member and engaging the aperture of the rail.

28. The truck bed loading platform of claim 27 further comprising push/pull means connected to the rod for reversibly retracting the rod from the rail to permit movement of the first and second tray portions.

* * * * *